No. 844,694. PATENTED FEB. 19, 1907.
G. G. SMITH.
PROCESS OF DRYING GAS.
APPLICATION FILED DEC. 12, 1901.
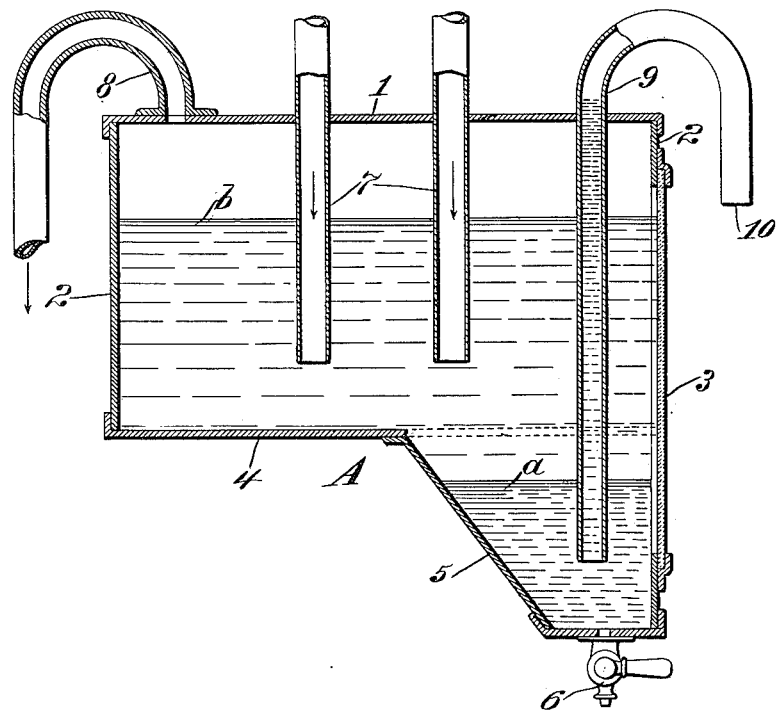
Witnesses:
Frederick G. Hachenberg.
Fred. E. Maynard.
Inventor:
George Gregory Smith.
By his Attorney.
F. H. Richards.

UNITED STATES PATENT OFFICE.

GEORGE GREGORY SMITH, OF FLORENCE, ITALY.

PROCESS OF DRYING GAS.

No. 844,694.     Specification of Letters Patent.     Patented Feb. 19, 1907.

Application filed December 12, 1901. Serial No. 85,547.

*To all whom it may concern:*

Be it known that I, GEORGE GREGORY SMITH, a citizen of the United States, residing in Florence, Italy, have invented certain new and useful Improvements in Processes of Drying Gas, of which the following is a specification.

This invention relates to the art of drying gas, and has for its object to provide an efficient method of removing moisture from the gas.

Another object of the invention consists in the process of removing moisture from gas within a closed chamber and automatically purging the chamber of the matter dried out of the gas.

In carrying out my invention I pass the gas through a suitable drying liquid of greater specific gravity than the gas and of less specific gravity than the moisture carried by the gas and cause the moisture in the gas to condense in the drier and throw down such condensation and remove the water of condensation from below the drier without permitting the escape of the gas.

The pressure of the gas, if desired, may be balanced by a column of liquid, and upon the overbalancing of the column by the pressure of liquid thrown down by the drier it may be expelled automatically and as often as sufficient collects to overbalance the column of liquid.

I have discovered that liquid vaseline has apparently no affinity for certain gases, among them acetylene, and, further, there appears to be no chemical affinity or reaction either upon the gas or the vaseline. The gas, upon passage through the vaseline, will be dried, having all moisture carried thereby condensed, and the vaseline will keep itself in its normal condition by precipitating the water of condensation.

Apparatus which is capable of use in the carrying out of my improved method of drying gas is made the subject of application for United States Letters Patent, Serial No. 26,215, filed August 8, 1900, for a combined drier and back-pressure valve.

For the purpose of facilitating the describing of my improved method of drying gas reference is made to the drawings accompanying and forming a part of this specification, wherein a vertical section of a form of apparatus is shown which is capable of utilization in carrying out my method.

The chamber (designated in a general way by A) comprises a top plate 1, end plates 2 2, one of which is provided with a window 3, and a bottom plate 4, having a well 5 at one end, at the bottom of which well is shown a petcock 6. Within the chamber are shown projecting two pipes 7 7, supposed to come from generators or other supply of gas, which pipes are shown as projecting for a considerable distance into the chamber. A gas-main 8 is shown as communicating with the upper part of the chamber and as being curved downward. A pipe 9 is shown as entering the top of the chamber and projecting down into the well, the upper end 10 of the pipe being shown as bent over and as being normally open. The chamber is also shown as containing liquids—a heavier liquid $a$ and a lighter liquid $b$—superimposed thereon.

In carrying out my method a body of some suitable liquid, which may be an oil having no affinity for the gas, and may be liquid vaseline, if desired, will be put in a suitable gas-tight chamber, and gas from a generator or other source of supply will be passed into the liquid, whereupon the moisture carried by the gas will be condensed and precipitated and the gas in a dry state and freed from any liquid or moisture carried from the point of supply or otherwise will pass on into the main.

After having determined the maximum amount of pressure which will be maintained in the main the length of the pipe 9 will be adjusted so that such maximum pressure will not displace the desired amount or charge of drier employed, and upon the accumulation of water or other liquid in the chamber, which will raise the surface-level of the drier, and consequently shorten the column of liquid within the discharge-pipes, the liquid at the lowest part of the chamber will be forced out through the pipe, and upon the reduction of the liquid within the chamber below a certain predetermined height the column of liquid within the tube will again overbalance the pressure of gas and no further liquid will be discharged. Instead of this automatic removal of the liquid dried out from the gas the same may be removed by some other suitable means. A petcock or other convenient device may be employed for the removal of the precipitate.

In the employment of my invention in the generation of gas from gas-producing agents wherein the agents become gradually exhausted until generation finally ceases there will be an uneven pressure in the chamber, and the moisture condensed from the gas upon one passage will upon the increase of pressure from the next generation be forced out. If a constant pressure exists in the chamber, the expulsion will occur upon the rise of liquid above the predetermined level upon its passage through the drier. The gas and moisture form an unstable mixture therewith more or less intimate, which upon separation leaves the three elements thereof stratified Impurities of the gas are divided out in the mixture and upon separation of the gas and drier remain in the drier and are precipitated with the condensed moisture.

Having described my invention, I claim—

1. The process of drying acetylene gas which consists in passing the gas through vaseline.

2. The process of drying gas which consists in bringing the gas in contact with vaseline.

3. The process of drying acetylene gas which consists in bringing the gas in contact with liquid vaseline.

4. The process of drying acetylene gas which consists in passing the same through liquid vaseline.

5. The process of drying acetylene gas which consists in passing the same rapidly through liquid vaseline.

6. The process which consists in passing acetylene gas from a generator through liquid vaseline contained in a closed vessel, thereby condensing the moisture carried by the gas, throwing down the water of condensation and collecting the water below the vaseline and automatically removing the water from the vessel.

7. The process of removing water from acetylene gas which consists in mixing the gas and water with liquid vaseline, then precipitating the water, and liberating the gas.

8. The process of removing water from acetylene gas which consists in mixing the gas and water with liquid vaseline, and liberating the gas.

9. The process of drying gas which consists in mixing the moisture carried by the gas with vaseline, and then precipitating the moisture.

10. The process which consists in passing acetylene gas from a generator through liquid vaseline, thereby throwing down water carried by the gas and collecting the water below such vaseline, and automatically ejecting the water therefrom.

11. The process which consists in permitting the gas from a generator to bubble through liquid vaseline, and thereby throw down the water carried thereby, and then collecting the water below such vaseline and ejecting the water by means of the gas-pressure, and regulating the amount of pressure necessary to so eject the water by means of a column of water.

12. The process which consists in passing acetylene gas from a generator through liquid vaseline, thereby removing and throwing down the water carried by the gas and collecting the water below such vaseline and automatically removing the water therefrom.

GEORGE GREGORY SMITH.

Witnesses:
PIERSON L. WELLS,
CHAS. LYON RUSSELL.